United States Patent [19]

Paranjpe

[11] 4,208,666
[45] Jun. 17, 1980

[54] MULTIPLE COPY INK JET PRINTER

[75] Inventor: Suresh C. Paranjpe, Xenia, Ohio

[73] Assignee: The Mead Corporation, Dayton, Ohio

[21] Appl. No.: 953,459

[22] Filed: Oct. 23, 1978

[51] Int. Cl.² ............... G01D 15/18; G01D 15/24; B65H 5/22
[52] U.S. Cl. ................................. 346/75; 346/134; 271/4
[58] Field of Search ............... 346/75, 1, 134, 138; 271/3, 4, 9, 276, 277

[56] References Cited

U.S. PATENT DOCUMENTS

| Re. 27,555 | 1/1973 | Loughren . |
| 1,817,098 | 8/1931 | Ranger et al. . |
| 3,564,120 | 2/1971 | Taylor . |
| 3,604,846 | 9/1971 | Behane et al. . |
| 3,689,693 | 9/1972 | Cahill et al. . |
| 4,009,332 | 2/1977 | Van Hook ............... 346/75 X |
| 4,064,513 | 12/1977 | Skala ........................ 346/75 |
| 4,112,469 | 9/1978 | Paranjpe et al. ........ 346/75 X |

Primary Examiner—George H. Miller, Jr.
Attorney, Agent, or Firm—Biebel, French & Nauman

[57] ABSTRACT

An ink jet printer and a method of printing are disclosed in which a plurality of sheets of copy paper are simultaneously supplied to a paper supporting drum prior to printing and simultaneously removed from the drum after printing. One print head or, alternately, multiple print heads may be utilized during the printing operation. The time required for loading copy paper onto the drum and removing it from the drum and also the time required for the print head or heads to complete printing on all of the sheets of copy paper are therefore both reduced, thus permitting attainment of higher copy rates.

11 Claims, 6 Drawing Figures

MULTIPLE COPY INK JET PRINTER

BACKGROUND OF THE INVENTION

The present invention relates to copying and duplicating devices and, more particularly, to such devices which are capable of printing a large number of copies per unit time, utilizing an ink jet printing arrangement. A number of non-contact copying devices are shown in the prior art as disclosed, for instance, in U.S. Pat. No. 1,817,098, issued Aug. 4, 1931, to Ranger et al; U.S. Pat. No. 3,604,846, issued Sept. 14, 1971, to Behane et al; and U.S. Pat. No. RE.27,555, issued Jan. 16, 1973, to Loughren. Each of the devices disclosed in these patents supports a copy sheet on a rotating drum, across which a non-contact printer is translated in a direction parallel to the rotational axis of the drum.

U.S. Pat. No. 3,564,120, issued Feb. 16, 1971, to Taylor, discloses a printer in which a plurality of jet drop print heads are scanned in rotary arcs over a print receiving web which is transported past the print heads. Such prior art devices are configured in a manner as to be adapted generally for use in an office copying or duplicating environment, but they are all considered to be too slow for most office copying applications.

A faster copier is shown in U.S. Pat. No. 3,689,693, issued Sept. 5, 1972, to Cahill et al. The Cahill device includes a plurality of print heads, typically eight, which co-operatively print stripes collectively representing an original image which is to be reproduced. This arrangement reduces the printing time of the copies which are made, but the system is somewhat limited by the fact that it has only one printing nozzle per print head. An even faster printing arrangement employs multiple nozzle heads which print interlaced helical tracks, as taught in U.S. Pat. No. 4,009,332, issued Feb. 22, 1977, to Van Hook.

A copier utilizing an ink jet printer generating a plurality of jets which print along interlaced helical print lines on a sheet of copy paper is disclosed in U.S. Application Ser. No. 789,417, filed April 21, 1977, by Paranjpe et al. The Paranjpe et al device contemplates mounting a sheet of copy paper on a paper supporting drum and translating a print head past the rotating drum. An arrangement is disclosed for synchronizing the operation of the print head and rotation of the drum upon which the sheet of copy paper is mounted, with optically scanning a master image which is to be reproduced.

A major limitation in the number of copies which may be made per unit time by a copier, having a sheet of copy paper mounted on a rotating drum past which a print head moves, is the time required for loading a sheet of copy paper onto the drum prior to printing and for removing it from the drum after printing is completed. The minimum time for unloading and loading a sheet of copy paper onto a drum is approximately 0.5 seconds, assuming that the drum must be substantially slowed during loading and unloading. Thus, it is clear that even if the time required to print a sheet of copy paper were to be reduced to zero seconds, the copy rate would be limited to 120 copies per minute. As a practical matter, of course, printing an image on a sheet of copy paper will take a finite period of time, and therefore the maximum theoretical copy rate is substantially less than this rate. Where multiple copies of a document are to be printed, it is highly desirable to be able to print at a higher rate.

Another limitation on the maximum copy rate obtainable is the time required to clear the bar. When an interlaced printing arrangement is utilized, such as disclosed in the above-referenced Paranjpe et al application, the print head must be initially positioned such that only a number of the jets at a first end of the head are positioned above the edge of the copy paper which is to be printed first. The print head is then slowly moved past the rotating drum upon which the sheet of copy paper is mounted, with each of the jets depositing drops along interlaced print lines on the sheet of copy paper. The print head must continue to move past the rotating drum until only a number of jets emanating from the second end of the print head are positioned above the sheet of copy paper at the edge of the paper which is to be printed last. The time required for moving a portion of the print head past the edge of the copy paper which is last printed is termed the "time to clear the print head" or bar. It develops that the time to clear the head is approximately constant for a given print resolution, utilizing a bar having a given number of jets per inch. Table 1 below shows the copy rate for different lengths of print bars for printing one sheet of copy paper at a time mounted on a rotating drum.

Table 1

| No. of Jets | Bar Width Inches | Time to Print Sec. | Time to Clear, Bar, Sec. | Time to Load/ Unload Sec. | Total Time Sec. | Copies/ Min. |
|---|---|---|---|---|---|---|
| 1 | | 233.75 | | .5 | 234.25 | .26 |
| 20 | .2 | 11.7 | .275 | .5 | 12.475 | 4.8 |
| 100 | 1.0 | 2.34 | .275 | .5 | 3.11 | 19.2 |
| 500 | 5 | 0.468 | .275 | .5 | 1.243 | 48 |
| 1000 | 10 | 0.234 | .275 | .5 | 1.01 | 59 |
| 3000 | 30 | 0.078 | .275 | .5 | 0.853 | 70 |

The above table was computed on the basis of 100 KHz stimulation frequency and 0.002 inch dot-to-dot spacing to cover an 8½ inch by 11 inch sheet of copy paper. It is seen from the above table that the time required to load and unload the paper and the time required to clear the print head become increasingly significant factors in the copy rate as the rate increases. For example, at 59 copies per minute, the time required for actual printing of a document is only 23% of the total time required to produce the copy. The time required for actual printing of a document at 70 copies per minute is only 9% of the total time required to produce the copy.

Thus, it is seen that a need exists for an improved ink jet copier for printing multiple copies in which the copy rate is increased.

SUMMARY OF THE INVENTION

A method of printing an image on a plurality of sheets of copy paper is implemented by a printer which includes a paper supporting drum means for supporting a plurality of sheets of copy paper. Means are provided for supplying the plurality of sheets of copy paper to the paper supporting drum means such that the sheets are supported on the drum means. An ink jet printer means generates a plurality of ink jet drop streams and selectively deposits drops from the drop streams on the sheets of copy paper while the sheets are supported on the paper supporting drum means. Means are provided for removing the plurality of sheets of copy paper from the paper supporting drum means after drops are selectively deposited thereon by the ink jet printer means. The time required for supplying sheets to the drum and removing sheets from the drum thereby comprises a relatively small portion of the time required for supplying the sheets to the drum, printing on the sheets, and removing the sheets from the drum.

The paper supporting drum means may include a paper supporting drum and means for rotating the drum as drops are selectively deposited upon the sheets of copy paper, such that drops from each drop stream will be deposited along print lines on the sheets of copy paper. The ink jet printer means may comprise means for moving the drop streams with respect to the paper supporting drum in a direction parallel to the axis of rotation of the drum, whereby the print lines on the sheets of copy paper will define helical paths about the periphery of the drum.

The ink jet printer means may further comprise means for generating a plurality of jet drop streams positioned in a row parallel to the direction of movement of the drop streams. The drop streams may be grouped into a plurality of sets of drop streams with each such set being displaced along the row by a predetermined distance from adjacent sets of drop streams. The predetermined distance may be selected such that drops in the drop streams of each of the plurality of sets are deposited on separate ones of the sheets of copy paper axially displaced along the drum.

Alternatively, the ink jet printer means may comprise means for generating a plurality of jet drop streams positioned in a pair of parallel rows with the rows being parallel to the direction of movement of the drop streams. The pair of parallel rows of drop streams may be spaced apart in a direction perpendicular to the rows such that drops from streams in one of the pair of rows are deposited on the sheets of copy paper along print lines which alternately interlace with print lines along which drops from streams in the other of the pair of rows are deposited.

Means for supplying the plurality of sheets of copy paper to the paper supporting drum means may comprise means for simultaneously supplying the plurality of sheets of copy paper to the plurality of sheets of copy paper at locations on the paper supporting drum means which are axially displaced therealong.

The method of the present invention by which the printer operates includes the steps of supplying a plurality of sheets of copy paper to a paper supporting drum such that the sheets of copy paper are supported by the drum, printing on all of the sheets of copy paper supported by the drum by selectively depositing ink drops on all of the sheets of copy paper, and removing all of the sheets of copy paper from the drum.

Accordingly, it is an object of the present invention to provide a printer and a method of printing in which a plurality of sheets of copy paper are loaded onto a paper support prior to printing and removed from the support subsequent to print; and, to provide such a printer and a method of printing in which the time required for the print head to move past the sheets of copy paper completely forms a reduced portion of the time required for producing each copy.

DETAILED DESCRIPTION OF THE PREFERRED EMBODIMENT

The present invention relates to an ink jet copier of the type which may be used to copy all types of printed text and graphic materials. The copier includes a scanner arrangement for optically scanning a master which is to be reproduced and for providing an electrical signal indicative of the tone of the master along a number of scan lines. The output of the scanner is converted by an encoder mechanism into print control signals which are used to control an ink jet printer. The ink jet printer deposits drops of ink on a plurality of sheets of copy paper to reproduce the image which was scanned on the master.

Figure 1:
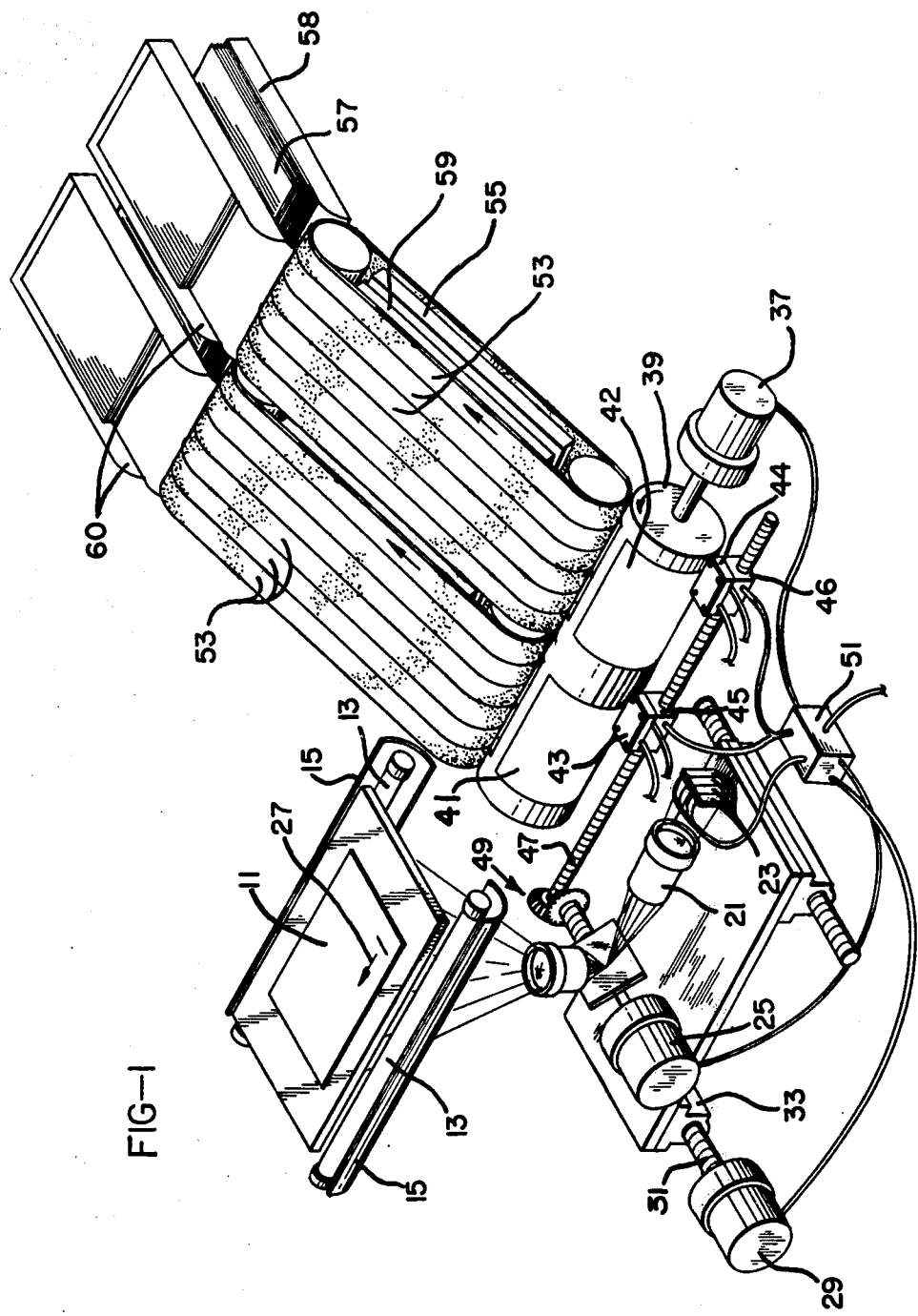
FIG. 1 is a schematic illustration of a copying system which operates in accordance with the present invention.

Reference is now made to FIG. 1 in which is shown an optical scanner of the type which may be used with an ink jet copier of the present invention. A master 11, which may include graphic or textile material, or both, is placed face down on a support plate 13 of transparent material, such as glass.

Lamps 13 and reflectors 15 are positioned to provide a uniform illumination of the printed surface of the master. Light reflected from the master 11 is directed by mirror 17 and lenses 19 and 21 to a plurality of photoelectric transducers 23. The mirror and lense arrangement is such that light reflected from a relatively small portion of the master 11 is directed to the photo- electric transducers 23.

Mirror 17 is mounted on a shaft connected to serve motor 25. As the mirror rotates, each of the transducers 23 receives light reflected from the master along a respective one of a plurality of parallel scan lines 27 on the master. The electrical output from each of the transducers 23 indicates the tone, that is, the "blackness"or "whiteness", of the master along its respective scan line. One rotation of the mirror will therefore reult in a strip of the master being scanned in its Y direction.

Servo motor 29 rotates threaded rod 31 which is threaded through member 33 attached to scanner table 35. As the servo motor 29 rotates, the scanner table 35, upon which servo motor 25, lenses 19 and 21, and transducers 23 are mcanted, is shifted in the X direction with respect to the master 11. The rotation of servo motor 29 is controlled with respect to the rotation of servo motor 25 such that a plurality of parallel scanning passes are made in the Y direction with respect to the master, with each such pass displaced laterally in the X direction with respect to theprevious pass.

A paper supporting drum means includes a servo motor 37 which rotates a drum 39 upon which are held a pair of sheets of copy paper 41 and 42. An ink jet printer means including print heads 43 and 44 are mounted on members 45 and 46, respectively, which engage threaded shaft 47. A right angle gear drive 49 at the ends of shafts 31 and 47 rotates shaft 47 in synchronism with shaft 31. The speed of rotation of servo motor 37 is controlled by servo controller 51 such that the ink jet print heads 43 and 44 will each make one print pass in the Y direction over the copy paper 41 and 42, respectively, in synchronism with one scanning pass in the Y direction over the master 11. Print heads 43 and 44 each have a plurality of jets, with each of the jets printing in response to outputs from corresponding respective ones of the photosensitive transducers 23. Ink jet print heads 43 and 44 move laterally with respect to sheets of copy paper 41 and 42 in synchronism with the lateral movement of the scanner. It is clear, therefore, that the scanner scans along scan lines on the master in precise synchronism with the movement of the print heads along corresponding print lines on the copy paper.

A means for simultaneously supplying two sheets of copy paper to the drum includes vacuum belts 53. Belts 53 cooperate with evacuated chambers 55 to transfer copy paper 57 from trays 58 to drum 39 for printing. After the printing operation is completed, belts 53 cooperate with evacuated chambers 59 to transfer the printed copies to trays 60. The scanner mechanism and the ink jet printer disclosed in FIG. 1 cooperatively scan and print a helically interplaced pattern as fully explained in copending U.S. patent application Ser. No. 789,417, filed Apr. 21, 1977, assigned to the assignee of the present invention. It should be realized, however, that there are many other optical scanning arrangements, including the scanning mechanisms disclosed in the above referenced patents to Behane et al and Sagae et al, which could be used in a copier embodying the present invention. The printing control circuitry may be of the type disclosed in U.S. Pat. No. 4,106,061, issued Aug. 8, 1978, and assigned to the assignee of the present invention.

An ink jet printer of the type which is suitable for use in the present invention is shown in U.S. Pat. No. 3,373,437, issued Mar. 12, 1968, to Sweet et al. The printer mechanism includes a plurality of ink jets, each of the jets controlled by a corresponding photosensitive transducer in the scanner. It should be appreciated that if a copier having a somewhat reduced definition is desired, a single photosensitive transducer may be used to scan a somewhat larger area and control more than one adjacent ink jet in the printer. In the device illustrated in FIG. 1, four photosensitive transducers are shown in the scanner and, correspondingly, printer 43 and 44 should each include four jets spaced apart a distance corresponding to the spacing of the four scan lines 27 on the master 11.

Figure 2:
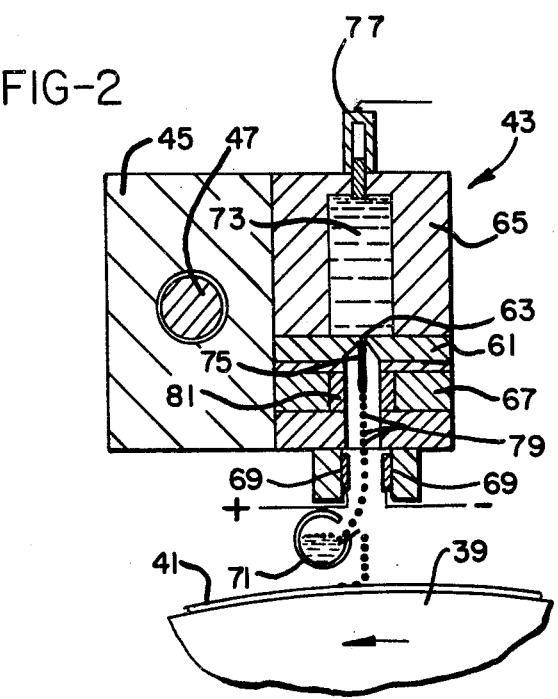
FIG. 2 is a sectional view showing an ink jet drop print head.

Referring to FIG. 2, an ink jet print head of the type which may be used in the present invention is shown. FIG. 2 is a sectional view of the print taken generally transverse to threaded shaft 47 in FIG. 1 and illustrating only one jet. Print head 43 may be of a laminar construction as generally taught by U.S. Pat. No. 3,586,907, issued June 22, 1971, to Beam et al.

Orifice plate 61 is provided with orifices, such as orifice 63, arranged in a line and separated by the distance betwen parallel scan lines as described above. Typically each orifice may have a diameter of about 0.04 mm with the orifices spaced on 0.5 mm centers. A fluid supply manifold 65, an orifice plate 61, a charge ring plate 67, deflection electrodes 69 and a catcher 71 comprise the primary elements of the print head. Manifold 65 contains a supply of conductive printing ink 73 which flows under pressure through orifice 63 to form ink jet filament 75.

Stimulator 77, operating under control of control unit 51, stimulates the filament 75 and causes it to break-up into a stream of uniformly spaced drops 79. The drops are charged selectively by charge ring 81 which is in-registration with orifice 63. Those drops which are charged are deflected by electrodes 69 into catcher 71 while the uncharged drops pass undeflected between the electrodes and are deposited onto the copy paper 41.

Drop charging and deflection is carried out as taught by the above mentioned Beam patent with drop charging being under control of the photosensitive transducer signals. The outputs from the transducers 23 must, however, be encoded in order to control the print operation. Drop stimulation can be accomplished in such a manner that all drops in all streams are generated in the same phase. For this purpose there may be employed a stimulation arrangement, as shown in U.S. Pat. No. 3,700,162, issued Oct. 24, 1972, to Titus et al.

Figure 3:
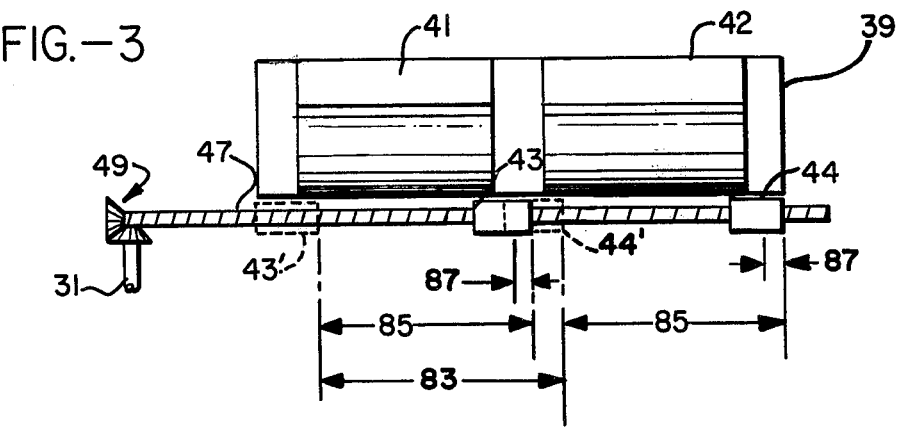
FIG. 3 is a schematic illustration of the printer of FIG. 1, showing the manner in which it operates.

Reference is now made to FIG. 3 which illustrates schematically the manner in which the printer of FIG. 1 operates. Print heads 43 and 44 are initially positioned, as shown in dashed lines, at positions 43' and 44'. Sheets of copy paper 41 and 42 are then loaded onto drum 39. Although sheets 41 and 42 are shown substantially axially displaced along drum 39 for the sake of clarity, it will be appreciated this wide spacing between sheets is not necessary.

Each of the print heads 43 and 44 will generate a plurality of jet drop streams which are positioned in a row parallel to the direction of movement of the print heads 43 and 44. Print head 43 will generate a first set of drop streams and print head 4 will generate a second set of drop streams which are displaced along the row by a predetermined distance 83 from the set of drop streams generated by print head 43. The effect of this arrangement is that the sets of drop streams are displaced along the row such that drops in the drop streams of each of the plurality of sets are deposited on separate ones of the sheets of copy paper axially displaced along the drum.

As the threaded shaft 47 rotates, each of the print heads will traverse a distance 85 during printing of the associated sheet of copy paper. Due to the interlaced printing scheme, it is necessary that the movement of each print head exceed the width of the associated sheet of copy paper by a distance 87. The time required for the print head to traverse the distance 87 is termed the "time to clear the print head." Since in the embodiment of FIG. 3, the print heads 43 and 44 simultaneously clear their associated sheets of copy paper 41 and 42, respectively, the time required to clear the print head on a per copy basis will be reduced by a factor of 2. Thus, the copy rate which may be obtained with the embodiment of FIG. 3 is given in Table 2, below.

Table 2

| No. of Jets | Bar Width | Time to Print Sec. | Time to Clear Sec. | Time to Load/ Unload Sec. | Total Sec. For 2 Copies | Copies/ Min. |
| --- | --- | --- | --- | --- | --- | --- |
| 20 | .2" | 11.7 | .275 | .5 | 12.475 | 9.6 |
| 100 | 1" | 2.34 | .275 | .5 | 3.115 | 38.5 |
| 1000 | 10" | .234 | .275 | .5 | 1.009 | 119 |

Table 2-continued

| No. of Jets | Bar Width | Time to Print Sec. | Time to Clear Sec. | Time to Load/ Unload Sec. | Total Sec. For 2 Copies | Copies/ Min. |
| --- | --- | --- | --- | --- | --- | --- |
| 3000 | 30" | .087 | .275 | .5 | 0.853 | 140.5 |

Figure 4:
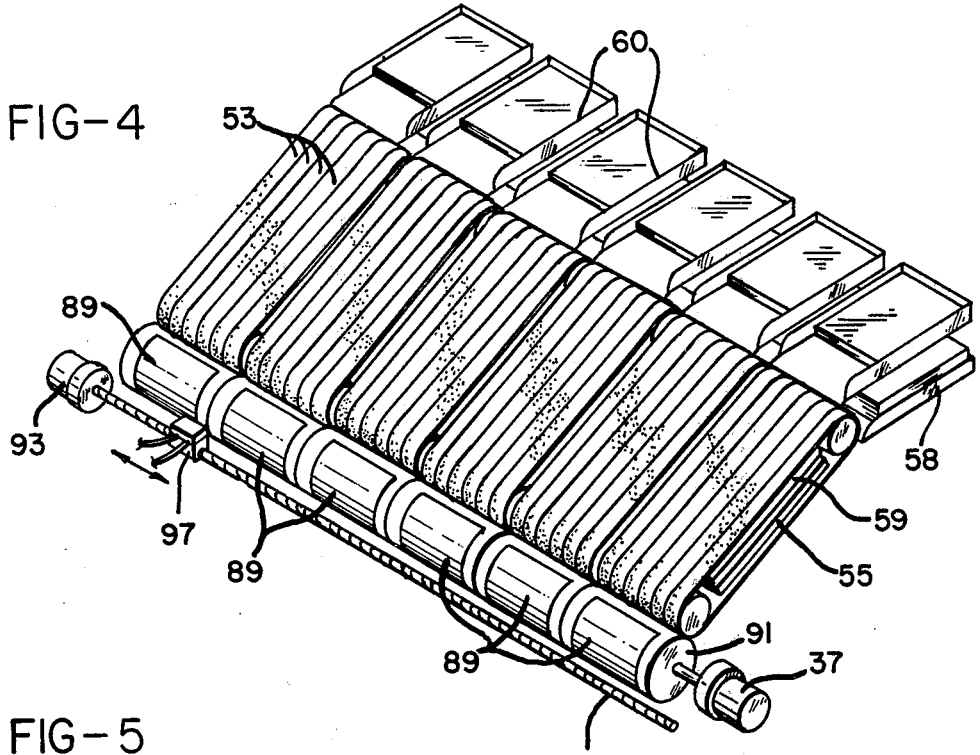
FIG. 4 is a schematic illustration of an alternative embodiment of the printer of the present invention.

A further embodiment of the present invention is illustrated in FIG. 4. This embodiment is similar in many respects to that of FIG. 1. A plurality of sheets of copy paper 89 are loaded onto a substantially longer drum 91. Accordingly, a greater number of trays 58 and 60, vacuum belts 53, and evacuated chambers 55 and 59 are required. Motor 93 rotates threaded shaft 95 such that the single print head 97 is moved with respect to the drum 91 in a direction parallel to the axis of rotation of the drum. The print head 97 generates a plurality of jet drop streams positioned in a row parallel to the direction of movement of the print head 97. Drops from the jets strike the copy paper and form interlaced print lines in a helical pattern on the sheets of copy paper 89. Thus a single print head accomplishes printing of all of the sheets of paper.

Although the sheets of copy paper 89 are shown substantially dsiplaced along the drum 91 in a direction parallel to the axis of rotation of the drum, it will be appreciated that the axial displacement between sheets of copy paper should be minimized in order to reduce the time required for the print head 97 to travel the entire length of the drum 91.

Figure 5:
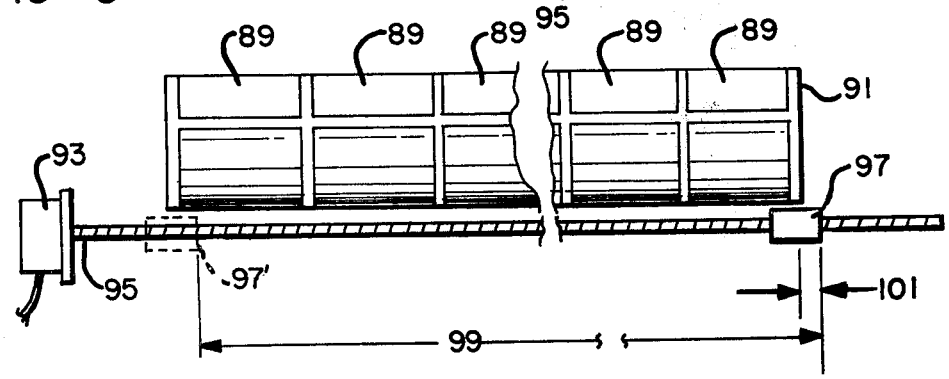
FIG. 5 is a schematic illustration of the printer of FIG. 4, as seen from above, showing the manner in which it operates.

FIG. 5 illustrates schematically the manner in which the printer of FIG. 4 operates. Print head 97 is initially positioned at position 97'. After all the sheets of copy paper 89 are positioned on the rotating drum 91 the print head is moved past the drum 91 by a distance 99. The time to clear the print head is the time required for the head to move the distance 101. Since the print head 97 clears only once after printing n copies, the time to clear the print head per copy is reduced by a factor of 1/n. Additionally, since the sheets of copy paper 89 are loaded onto the drum 91 simultaneously prior to printing and removed from the drum 91 simultaneously after printing, the time required to handle the sheets of copy paper 89 per copy is reduced by a factor of 1/n. Thus, if two sheets of copy paper are printed on a drum using a single print head in the arrangement of FIG. 5, the copy rate obtainable would be as shown in Table 3 below.

Table 3

| No. of Jets | Bar Width | Time To Print Sec. | Time to Clear Sec. | Time to Load/ Unload Sec. | Total Sec. for 2 Copies | Copies/ Min. |
| --- | --- | --- | --- | --- | --- | --- |
| 20 | .2" | 23.4 | .275 | .5 | 24.175 | 4.8 |
| 1000 | 1" | 4.68 | .275 | .5 | 5.455 | 22 |
| 1000 | 10" | .468 | .275 | .5 | 1.243 | 96 |
| 3000 | 30" | 0.156 | .275 | .5 | 0.931 | 129 |

Similarly, the copy rates obtainable when three sheets of copy paper or four sheets of copy paper are mounted on a drum and printed with a single print head are given in Tables 4 and 5, respectively, below.

Table 4

Printing 3 Pages/Drum with 1 Print Head

| No. of Jets | Bar Width | Time to Print Sec. | Time to Clear Sec. | Time to Load/ Unload Sec. | Total Sec. for 3 Copies | Copies/ Min. |
| --- | --- | --- | --- | --- | --- | --- |
| 20 | .2" | 35.1 | .275 | .5 | 35.88 | 5.02 |
| 100 | 1" | 7.02 | .275 | .5 | 7.80 | 23 |
| 1000 | 10" | .702 | .275 | .5 | 1.48 | 122 |
| 3000 | 30" | .234 | .275 | .5 | 1.012 | 178 |

Table 5

Printing 5 Pages/Drum with 1 Print Head

| No. of Jets | Bar Width | Time to Print Sec. | Time to Clear Sec. | Time to Load/ Unload Sec. | Total Sec. for 5 Copies | Copies/ Min. |
| --- | --- | --- | --- | --- | --- | --- |
| 20 | .2" | 58.5 | .275 | .5 | 59.2 | 5.1 |
| 100 | 1" | 11.7 | .275 | .5 | 12.4 | 24 |
| 1000 | 10" | 1.17 | .275 | .5 | 1.95 | 154 |
| 3000 | 30" | 0.39 | .275 | .5 | 1.17 | 256 |

Figure 6:
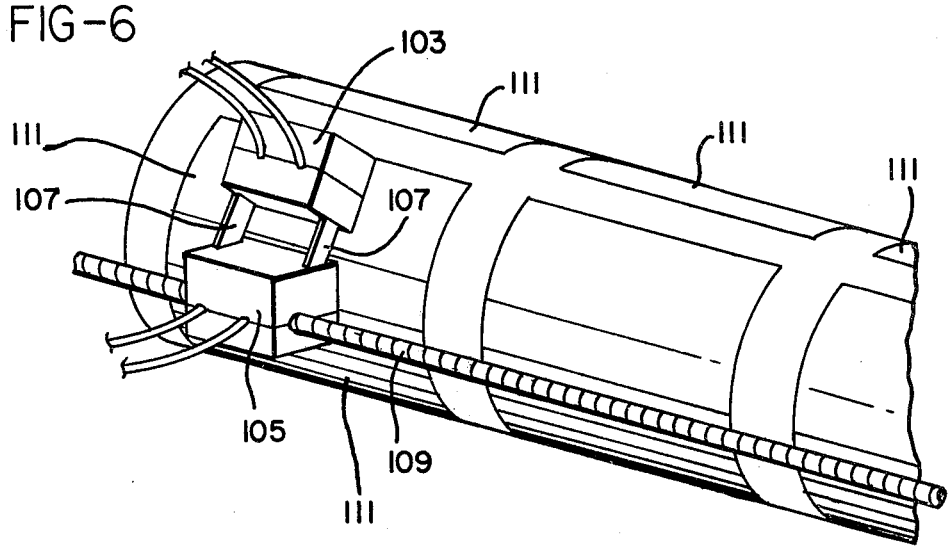
FIG. 6 is a schematic illustration of a further embodiment of the printer of the present invention.

As is clear from the above, the time required to clear the print head is directly related to the width of the head, assuming that the jet density, print resolution, stimulation frequency and number of drops per dot remain constant. It is possible, therefore, to reduce the time to clear the print head by reducing the width of the print head. If the number of jets generated by the print head is correspondingly reduced, however, this would also result in increasing the time required for printing, assuming a constant print image. Alternatively, the time for printing could be maintained while reducing the print image resolution. In order to reduce the width of the print head without sacrificing resolution of the printed image, a printer arrangement as shown in FIG. 6 may be utilized. A pair of print heads 103 and 105 are fastened together by brackets 107 and moved in unison along threaded shaft 109. Each print head generates a plurality of jet drop streams which are arranged in rows parallel to the direction of movement of the print heads 103 and 105. The row of drop streams generated by print head 103 is therefore parallel to the row of drop streams generated by print head 105. The pair of parallel rows of drop streams are spaced apart in a direction perpendicular to the rows such that drops from the streams in one of the pair of rows are deposited on the sheets of copy paper 111 along print lines which alternately interlace with print lines along which drops from the other of the pair of rows of drop streams are deposited.

Such a dual row interlace scheme has been utilized in the past in ink jet printers to increase resolution of the printed image, as shown in U.S. Pat. No. 3,701,998, issued Oct. 31, 1972, to Mathis. The resolution of an image printed with the printer of FIG. 6 will equal that of a printer having a single print head which is twice as long as the print heads shown in FIG. 6 for a given jet density. The time to clear the heads will only be half as long as that required for a printer having a longer print head, however.

Another variation of the printer illustrated in FIG. 4 may comprise two or more axially aligned adjacent drums, each drum having its own drive mechanism. One or more sheets of copy paper will be supplied to and mounted upon each of the drums. A single print head will then move past the drums in a direction parallel to the axis of rotation of the drums and the jets generated by the print head will print along helical print lines on the sheets of copy paper mounted on both of the drums. By using several drums, sheets may be loaded and unloaded during printing from one of the drums while sheets on the other drums are being printed.

While the forms of apparatus herein described constitute preferred embodiments of the invention, it is to be understood that the invention is not limited to these precise forms of apparatus, and that changes may be made therein without departing from the scope of the invention.

What is claimed is:

1. A method of printing a plurality of sheets of copy paper utilizing an ink jet printing process, comprising the steps of
   supplying a plurality of sheets of copy paper to a paper supporting drum such that said sheets of copy paper are axially spaced along said drum and supported thereby,
   rotating said drum,
   printing on each of said sheets of copy paper in succession by selectively depositing ink drops from a plurality of jet drop streams generated by a single print head onsaid sheets of copy paper during a plurality of rotations of said drum, and
   removing all of said sheets of copy paper from said drum.

2. The method of printing of claim 1 in which said steps of printing further includes the steps of
   moving said plurality of ink jet drop streams with respect to said drum in a direction parallel to the axis of rotation of said drum such that ink drops from said jet drop streams are selectively deposited successively on each of said sheets of copy paper.

3. The method of printing of claim 2 further comprising the step of generating a plurality of ink jet drop streams which are positioned in a row parallel to the direction of movement of said plurality of ink jet drop streams.

4. The method of printing of claim 2 further comprising the step of generating a plurality of ink jet drop streams which are positioned in a pair of rows, which rows are parallel to the direction of movement of said plurality of ink jet drop streams.

5. The method of printing of claim 4 in which said step of generating a plurality of jet drop streams which are positioned in a pair of rows includes the step of generating a plurality of jet drop streams positioned in a pair of parallel rows, which rows are spaced apart in a direction perpendicular to said rows such that drops from streams in one of said pair of rows are deposited on said sheets of copy paper along print lines which alternately interlace with print lines along which drops from streams in the other of said pair of rows are deposited.

6. An ink jet printer for printing an image on a plurality of sheets of copy paper, comprising:
   a paper supporting drum for supporting a plurality of sheets of copy paper,
   means for simultaneously supplying said plurality of sheets of copy paper to said paper supporting drum such that said sheets are supported on said drum and are arranged axially therealong,
   ink jet printer means, including a single print head, for generating a plurality of ink jet drop streams and selectively depositing drops from said drop streams on each of said sheets of copy paper in sequence while said sheets are supported on said paper supporting drum means, and
   means for simultaneously removing said plurality of sheets of copy paper from said paper supporting drum after drops are selectively deposited thereon by said ink jet printer means, whereby the time required for supplying said sheets to said drum and removing said sheets from said drum comprises a relatively small portion of the time required for supplying said sheets to said drum, printing an image on said sheets in sequence, and removing said sheets from said drum.

7. The ink jet printer of claim 6 in which said paper supporting drum means comprises:
   means for rotating said drum as said drops are selectively deposited upon said sheets of copy paper such that drops from each drop stream are deposited along print lines on said sheets of copy paper.

8. The ink jet printer of claim 7 in which said ink jet printer means comprises means for moving said drop streams with respect to said paper supporting drum in a direction parallel to the axis of rotation of said drum whereby said print lines on said sheets of copy paper will define helical paths about the periphery of said drum.

9. The ink jet printer of claim 8 in which said printed head further comprises means for generating a plurality of jet drop streams positioned in a row parallel to the direction of movement of said drop streams.

10. The ink jet printer of claim 8 in which said ink jet printer means further comprises means for generating a plurality of jet drop streams positioned in a pair of parallel rows, said rows being parallel to the direction of movement of said drop streams.

11. The ink jet printer of claim 10 in which said pair of parallel rows of drop streams are spaced apart in a direction perpendicular to said rows such that drops from streams in one of said pair of rows are deposited on said sheets of copy paper along print lines which alternately interlace with print lines along which drops from streams in the other of said pair of rows are deposited.

* * * * *

UNITED STATES PATENT AND TRADEMARK OFFICE
CERTIFICATE OF CORRECTION

PATENT NO. : 4,208,666
DATED : June 17, 1980
INVENTOR(S) : Suresh C. Paranjpe

It is certified that error appears in the above-identified patent and that said Letters Patent are hereby corrected as shown below:

Column 3, line 48, after "the", insert --paper supporting drum means and means for positioning the--.
Column 4, lines 44 and 45, "photo-electric" should be --photoelectric--.
Column 4, line 65, "theprevious" should be --the previous--.
Column 6, line 9, "in-" should be --in--.
Column 7, line 9, ".087" should be --.078--.
Column 7, line 61, "1000" should be --100--.
Column 9, line 27, "onsaid" should be --on said--.

Signed and Sealed this

Twenty-eighth Day of October 1980

[SEAL]

Attest:

SIDNEY A. DIAMOND

Attesting Officer

Commissioner of Patents and Trademarks